United States Patent [19]

Sandoval

[11] 4,030,298
[45] June 21, 1977

[54] THERMAL MOTOR

[76] Inventor: Dante J. Sandoval, 6412 Pear Ave., Cleveland, Ohio 44102

[22] Filed: Feb. 19, 1976

[21] Appl. No.: 659,338

Related U.S. Application Data

[62] Division of Ser. No. 527,254, Dec. 13, 1974.

[52] U.S. Cl. ................................ 60/527; 60/529
[51] Int. Cl.² ......................................... F03G 7/06
[58] Field of Search ..................... 60/527, 528, 529

[56] References Cited

UNITED STATES PATENTS

| | | | |
|---|---|---|---|
| 3,303,642 | 2/1967 | Lee | 60/527 X |
| 3,913,326 | 10/1975 | Banks | 60/527 |
| 3,937,019 | 2/1976 | Renner | 60/527 |

Primary Examiner—Allen M. Ostrager
Attorney, Agent, or Firm—Meyer, Tilberry & Body

[57] ABSTRACT

This invention relates to apparatus for the conversion of thermal energy into mechanical motion. Transducers, such as nickel-titanium alloys, are employed which change their configuration and pliancy upon the application of stimulus such as heat. In the absence of a suitable stimulus, they are pliant and easily flexed. However, when stimulated they tend to assume a prederminable configuration and then become rigid. Apparatus utilizing these phenomena convert the energy of physical transformation into useful mechanical work.

Several embodiments are described. In one, the transducer is belt shaped and drivingly connected to several pulleys. Heat stimulus is applied to the belt locally adjacent at least one of the pulleys. The resultant straightening forces, inherent in an alloy such as nickel-titanium, cause rotation of the belt and hence the pulleys. In another embodiment, the transducers are opposingly connected to a reciprocating member so as to produce reciprocating motion when selectively stimulated.

9 Claims, 11 Drawing Figures

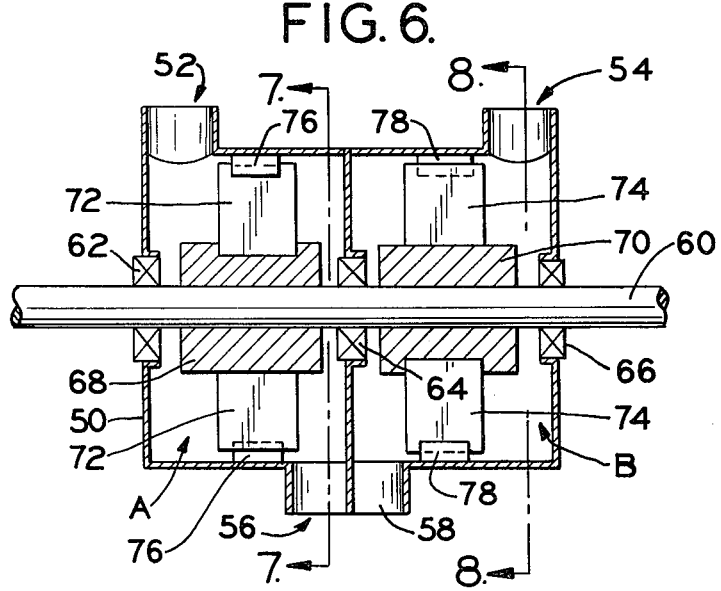
FIG. 6.
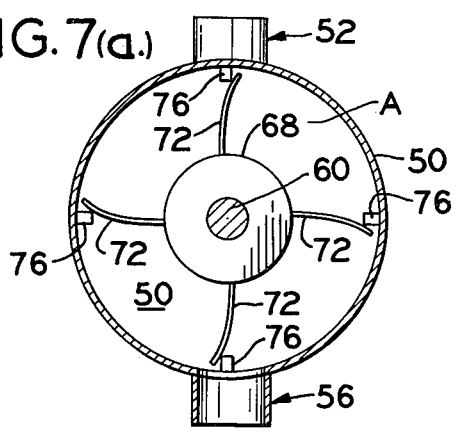
FIG. 7(a).
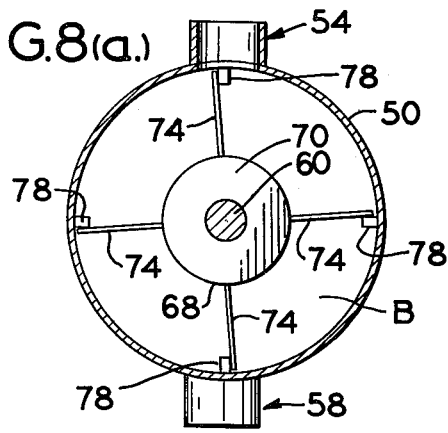
FIG. 8(a).
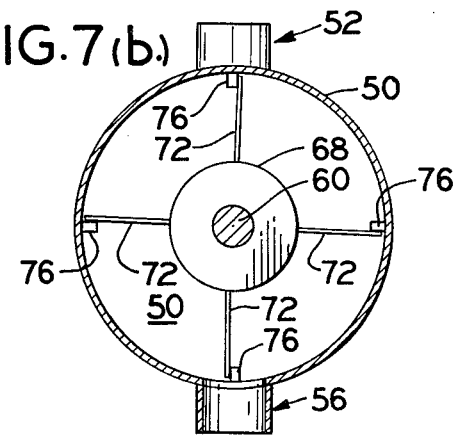
FIG. 7(b).
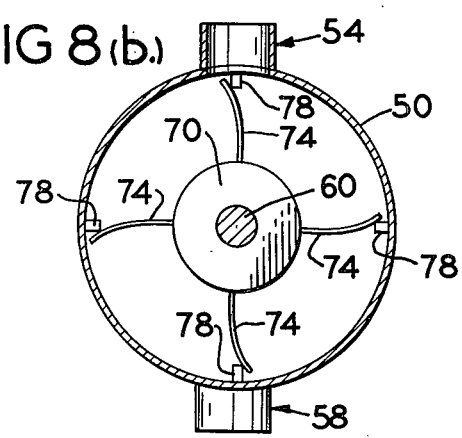
FIG 8(b.)

THERMAL MOTOR

This is a division of application Ser. No. 527,254 filed Dec. 13, 1974.

The present invention relates to transducer powered devices, and more particularly to thermal motors.

The invention disclosed may be powered from any conventional heat source, such as gas, oil, electric, or steam heat, as well as solar and geothermal energy. It is best suited for high torque-low RPM uses, but is also easily adaptable to many other applications.

The work producing element comprises one or more transducers of a type that are pliant in one mode and may be triggered into a second mode wherein they strive to return to a preset configuration. In a preferred embodiment these transducers are constructed of Nitinol.

Nitinol is a nickel-titanium alloy which was discovered in 1962 at the United States Naval Ordinanace Laboratory to have shape memorization properties. Sheets or wires constructed of this alloy can normally be deformed easily, yet if heated above a certain "transition" temperature they assume a rigidity and a preset configuration. The transition temperature is set by the composition of the alloy. Because of the setable and sharply defined nature of the transition temperature, as well as the repeatability of the deformation-reformation cycle, the alloy is well suited for use as transducer means in this invention.

For the purpose of this application reference to a "transducer" shall mean an alloy having the above described properties of Nitinol, as distinguished from a common bi-metal transducer of the type used in thermostatic controls and the like.

Though described with particular reference to Nitinol, it will be appreciated that this invention will have equal utility with any similar transducer means.

It is an object of the present invention to utilize transducer means to continuously convert energy directly into useful mechanical motion.

It is a further object of this invention to convert energy in the form of a heat differential directly into either smooth and continuous circular motion or reciprocating motion.

It is yet another object of this invention to utilize a nickel-titanium alloy to these uses.

It is still another object of this invention to accomplish the before stated objects in a simple mechanical manner.

Other important objects will become apparent to those skilled in this art as the disclosure is more fully made.

The invention will be further described in relation to the FIGURES, in which.

Figure 1:
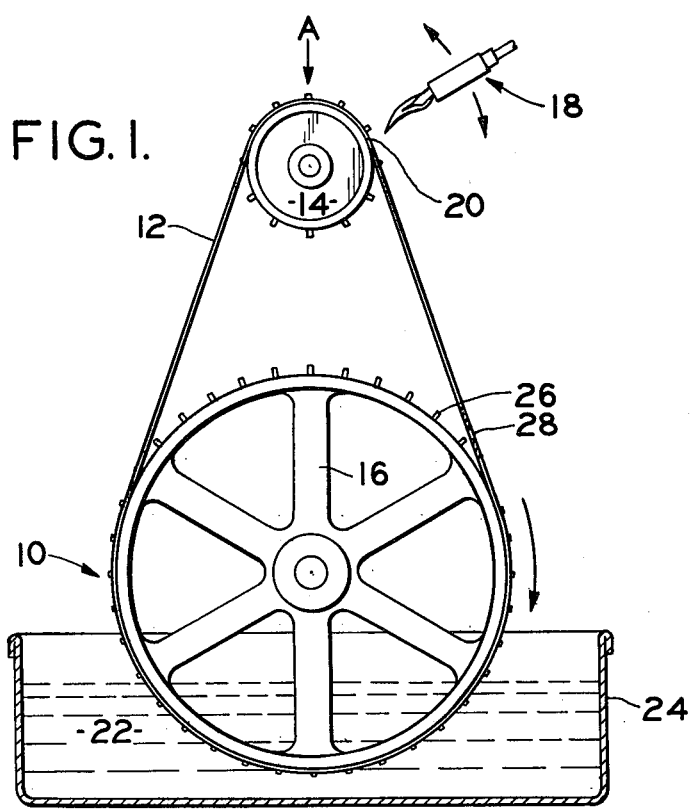
FIG. 1 is an illustration of a preferred embodiment of the invention utilizing rotary motion with an endless belt drive.
Figure 3A:
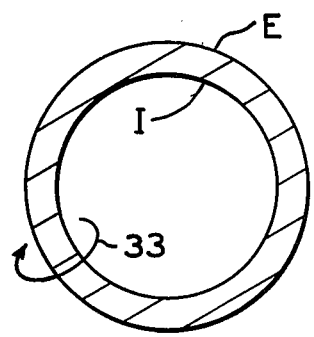
Figure 3B:
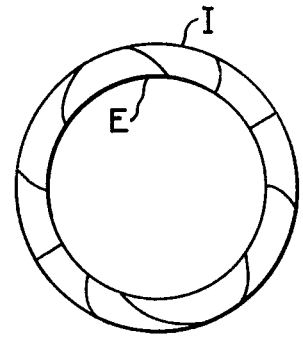
Figure 4:
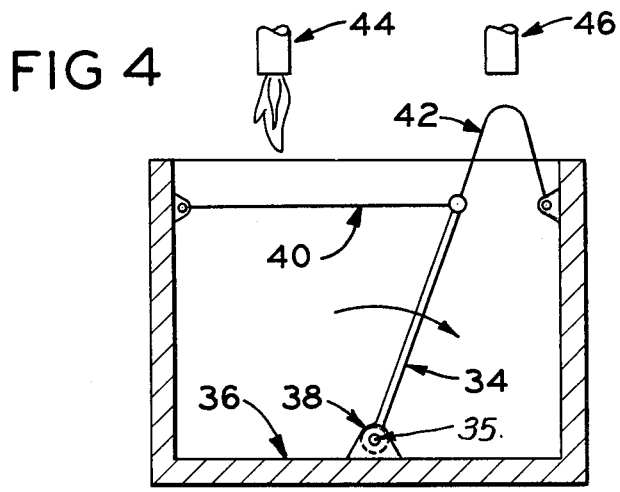
Figure 5:
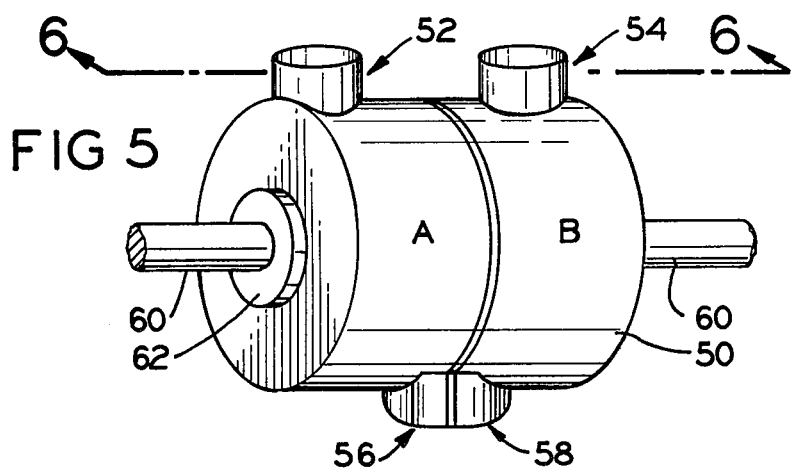

FIGS. 3(a) and 3(b) are schematic illustrations of a method of setting the desired memorized configuration into the belt for the embodiment pictured in FIG. 1;

FIG. 4 is a diagramtic illustration of another embodiment of the invention utilizing reciprocating motion;

FIG. 5 is a perspective view of a functional embodiment of the device diagramatically illustrated in FIG. 4;

FIG. 6 is a sectional view taken along the line 6—6 of FIG. 5;

FIGS. 7(a) and (b) are sectional views taken along the line 7—7 of FIG. 6; and,

FIGS. 8(a) and (b) are sectional views taken along the line 8—8 of FIG. 6.

Referring now to the FIGURES in detail, FIG. 1 pictures a preferred embodiment of the device 10, in which a belt 12, composed at least in part of a Nitinol alloy or other material with similar shpae memorization properties, drivingly engages two pulleys 14 and 16 of dissimilar diameter. Stimulus 18 is applied to the belt at 20 adjacent the smaller pulley 14. The unstimulated portions of the belt are pliant and conform flexibly to the shape of the pulleys, presenting little resistance to rotation. The stimulated portion of the belt, on the other hand, rigidly tends toward a present configuration of less curvature than the perimeter of pulley 14. When this occurs, the stimulated portion of the belt attempts to pull away from the pulley, producing resultant forces which cause rotation of the belt and pulleys. If the stimulus is applied to the right of point A, as shown, the rotation produced is in a clockwise direction. If the stimulus is applied to the left of point A, counter clockwise rotation results. When the stimulus is applied symetrically about point A, the rotational forces are in equilibrium and no motion results. Thus, by moving the point of application of stimulation, rotational speed and direction may be controlled. Though pulley 16 need not be any specific size, it is preferred that it be large so that a minimum of energy is expended in conforming the belt to the shape of the pulley.

If the transducer to be used is Nitonol, then the stimulation required is the application of heat sufficient to raise the temperature of a portion of the belt above its transition temperature. If the transition temperature is set close to the ambient, low grade heat sources may be used but difficulties may be encountered in cooling the remainder of the belt significantly below the transition temperature. It is preferred that the transition temperature be set somewhat higher so that ambient cooling is sufficient to lower the temperature of the remainder of the belt. Pulley 16 may be partially immersed in a coolant such as water 22 in container 24 to accelerate the rate of cooling. A heat source, such as a fuel burner, electric heating element, or solar or geothermal accumlator may then be used as a suitable stimulus.

Figure 2:
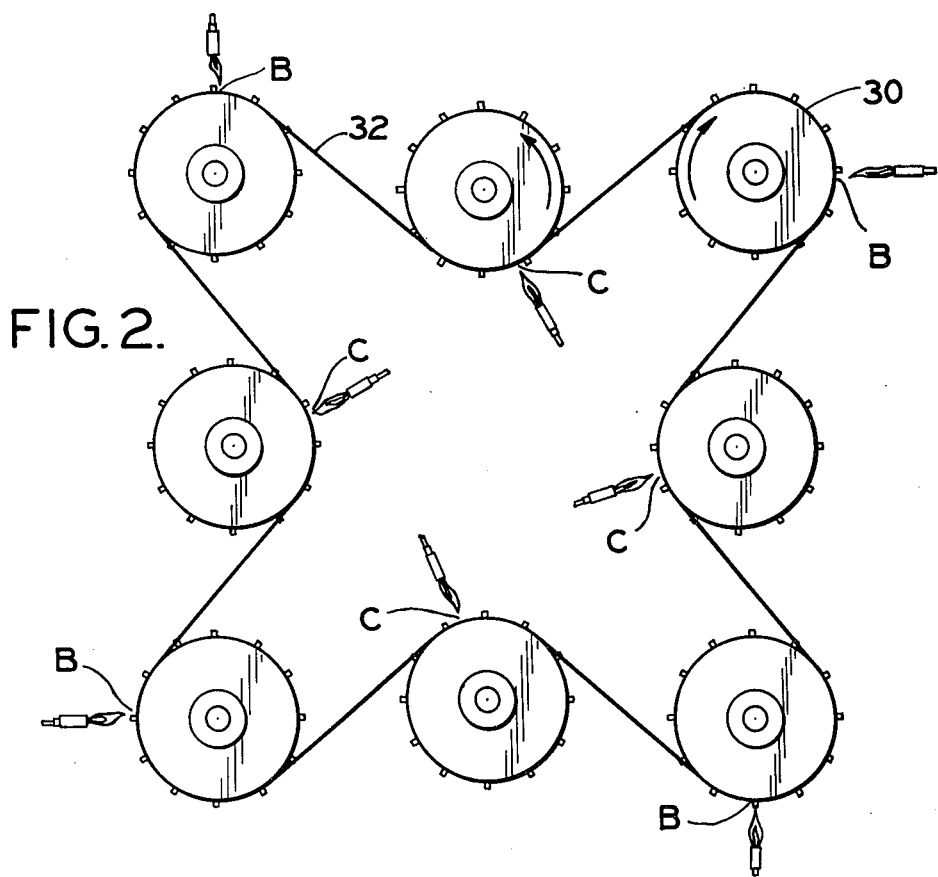
FIG. 2 is an illustration of another embodiment of the invention in which the curvature of the belt is reversed to eliminate permanent set in the belt.

FIG. 2 illustrates another embodiment of the invention, whereby the belt sequentially engages several pulleys 30 arranged to take permanent set out of the belt. This scheme and similar other arrangements may be used to minimize the natural fatigue of the memorized configuration which occurs through repeated stimulation cycles. In the embodiment pictured in FIG. 1, continued operation will cause the memorized configuration to slowly conform to the shape of the pulley about which stimulation is applied, thereby generally degrading operation of the device. In the device pictured in FIG. 2, with stimulus applied at multiple points B and C of belt 32, the memory fatigue of the two stimulated areas will oppose each other and no degradation of operation will result. The intensity of heat applied to succeeding pulleys may be varied so as to offset the differing extents to which the belt embraces those pulleys. The memorized configuration of the belt for this embodiment should preferably be rectilinear. Additionally, the torque of the device may be multiplied by increasing the number of zones of stimulus application.

In any embodiment, the belt should be engaged to the pulleys in such a manner as to preclude slippage, as in FIGS. 1 and 2 where cogs 26 on the pulley 16 engage corresponding holes 28 in the belt 12.

FIGS. 3(a) and 3(b) are edgewise illustrations of the belt used in the embodiment shown in FIG. 1. The thickness of the belt has been grossly exaggerated for ease of illustration. These figures illustrate a method of imparting to the belt the memorized configuration desired.

A generally circular memorized configuration is first established through high temperature processing of the belt in the manner well known to those skilled in this art. The memorized configuration thus established generally follows the contour of the belt, as shown in FIG. 3(a). The belt is then cold formed by turning it inside out, thus reversing the interior surface I and the exterior surface E, as indicated by arrow 33 in FIG. 3(a). This alters the configuration of the belt as shown in FIG. 3(b). Although the normal disposition of the belt is still circular, the memorized configuration, shown by the interior shading of the belt, no longer follows this disposition. Upon stimulation the belt will attempt to regain its memorized configuration which is now convex to its normal disposition.

FIG. 4 is a schematic illustration of yet another embodiment of the invention. Drive means 34 is integrally attached at its lower portion to a drive shaft 35 rotatably mounted in bearing means 38 secured to housing 36. Opposingly mounted transducers 40 and 42 and secured to the upper portion of drive means 34 and to the housing 36. The transducers are pliant and easily flexed until stimulus is selectively applied by heat stimulus sources 44 and 46, wherein they then alternately tend to straighten and to become rigid. Alternate cyclical application of stimulus to the two transducers 40 and 42 causes reciprocating motion of the pivotable member 34.

Another preferred embodiment of the invention is illustrated in FIGS. 5–8. The housing 50, comprised of two chambers A and B, contains inlet ports 52 and 54 and outlet ports 56 and 58. A drive shaft 60 is rotatably mounted through the chambers on annular frictionless bearing races 62, 64, and 66. Drive means in the form of hubs 68 and 70 are rigidly affixed to the drive shaft 60. Rectangular transducer strips 72 and 74, composed of a Nitinol alloy, radiate in a spoke-like manner from the drive means 68 and 70, to which they are firmly attached. These strips abut tabs 76 and 78, which are connected to the interior of the housing 50. All of the strips in each chamber abut the tabs in the same rotational sense and are conditioned to similarly flex against them when stimulus is applied.

Referring now to FIGS. 7(a) through 8(b), for illustrative purposes it will be assumed that the memorized configuration of the transducer strips is rectilinear. Operation entails two cycles. Initially the drive shaft 60, drive means 68 and 70, and transducer strips 72 and 74 are disposed as shown in FIG. 7(a) and 8(a). In the first cycle, chamber A is flooded with hot fluid, such fluid being well above the transition temperature; and chamber B is flooded with cold fluid, such fluid being well below the transition temperature. Transducer strips 72 strive to regain their memorized configuration, thus applying a torque through drive means 68 to the drive shaft 60. This produces clockwise rotational motion and places the device in the position shown in FIGS. 7(b) and 8(b). In the second cycle chamber B is flushed with hot fluid chamber A is flushed with cold fluid. Transducer strips 74 in chamber B regain their memorized rectilinear configuration, causing counter clockwise rotation which returns the device to its initial position. Continued cyclical stimulation will cause continuous reciprocating motion, which may, if desired, be converted into continuous circular motion in any conventional manner.

Greater torque may be obtained by increasing the number of transducer strips used in each chamber.

It will be appreciated by those skilled in the art that my invention may be carried into practice in any number of other alternate embodiments. Those embodiments described are set forth by way of example and not of limitation.

Having thus described my invention, I claim:

1. A device for the conversion of energy into mechanical motion comprising:
   a housing;
   a drive shaft mounted in said housing;
   a plurality of reed like transducers each having first and second ends, said transducers adapted to flex upon the application of stimulus, said transducers being rigidly attached in radial alignment to said drive shaft at said first ends and drivingly engaging said housing at said second ends, wherein stimulation of at least one of said transducers causes clockwise movement of said drive shaft, and stimulation of at least another of said transducers causes counterclockwise movement of said drive shaft; and,
   means to apply stimulus first to at least one of said transducers, to cause reciprocating motion of said drive shaft.

2. The device set forth in claim 1, wherein said housing comprises two or more chambers, said chambers each housing one or more of said transducers.

3. The device set forth in claim 2, wherein said transducers housed in each of said chambers act substantially uniformly upon said drive shaft.

4. The device set forth in claim 2, including means to flush a chamber with fluid the temperature of which is above the transition temperature of said transducers and means to simultaneously flush another chamber with fluid the temperature of which is below said transition temperature whereby the transducer in said first mentioned chamber is stimulated while the stimulation of the transducer in the second mentioned chamber is arrested to impart movement to said drive shaft.

5. The device set forth in claim 3, wherein said drive means are axially disposed through said chambers and said transducers are radially disposed about said drive shaft in a substantially spoke like manner.

6. The device set forth in claim 5, wherein alternate stimulation and destimulation of said transducers causes reciprocating motion of said axially disposed drive shaft.

7. The device as set forth in claim 1 in which said drive shaft and said transducers are formed in one piece from transducer material.

8. A device for the conversion of energy into mechanical motion comprising: a housing divided into two or more chambers; a drive shaft rotatably mounted to extend axially through said chambers; at least one reed like transducer rigidly secured to said shaft in each of said chambers and extending radially therefrom; abutment means in each chamber against which the free end of said transducer may abut; means to flush said chambers alternately with hot and cold fluid to simultaneously stimulate and de-stimulate transducers in different chambers to flex whereby the reaction between a first stimulated transducer in a first chamber and a first abutment means causes said drive shaft in a clockwise direction and reaction between a second transducer in a second chamber against a second abutment means causes said drive shaft of shift in a counterclockwise direction.

9. The device set forth in claim 4, wherein each of said chambers are alternately flushed with transducer stimulating fluids and transducer de-stimulating fluids.

* * * * *